(12) United States Patent
Qureshi

(10) Patent No.: US 9,223,970 B2
(45) Date of Patent: Dec. 29, 2015

(54) EVALUATING APPLICATION INTEGRITY

(71) Applicant: Citrix Systems, Inc., Fort Lauderdale, FL (US)

(72) Inventor: Waheed Qureshi, Pleasanton, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 53 days.

(21) Appl. No.: 14/154,590

(22) Filed: Jan. 14, 2014

(65) Prior Publication Data

US 2015/0199515 A1 Jul. 16, 2015

(51) Int. Cl.
*G06F 21/56* (2013.01)
*G06F 9/44* (2006.01)
*H04L 29/06* (2006.01)
*H04W 4/00* (2009.01)
*H04W 12/12* (2009.01)

(52) U.S. Cl.
CPC *G06F 21/56* (2013.01); *G06F 8/70* (2013.01); *H04L 63/20* (2013.01); *H04W 4/003* (2013.01); *G06F 2221/033* (2013.01); *H04W 12/12* (2013.01)

(58) Field of Classification Search
CPC combination set(s) only.
See application file for complete search history.

(56) References Cited

U.S. PATENT DOCUMENTS

2013/0097659 A1\* 4/2013 Das et al. ............... 726/1
2013/0227636 A1 8/2013 Bettini et al.

OTHER PUBLICATIONS

International Search Report and Written Opinion dated Sep. 10, 2014 in International Application No. PCT \2014\011668.
Larson, Brad, "Does apple view the actual source code when approving apps?," Feb. 4, 2011, Retrieved from Internet: http://stackoverflow.com/questions/3186648/does-apple-view-the-actual-source-code-when-approving-apps, 4 pages.

\* cited by examiner

*Primary Examiner* — Beemnet Dada
(74) *Attorney, Agent, or Firm* — Banner & Witcoff, Ltd.

(57) ABSTRACT

Methods, systems, computer-readable media, and apparatuses for evaluating application integrity are presented. In one or more embodiments, an application store, which may be provided by one or more computing devices, may analyze one or more aspects of an application. Subsequently, the application store may determine, based on the one or more analyzed aspects of the application, an integrity score for the application. Based on the integrity score, the application store may determine whether to publish the application in the application store. In response to determining to publish the application in the application store, the application store then may publish the application in the application store. Alternatively, in response to determining not to publish the application in the application store, the application store may generate a notification indicating that the application has an insufficient integrity score.

20 Claims, 10 Drawing Sheets

US 9,223,970 B2

EVALUATING APPLICATION INTEGRITY

BACKGROUND

Aspects of the disclosure relate to computer hardware and software. In particular, one or more aspects of the disclosure generally relate to computer hardware and software for evaluating application integrity.

Increasingly, corporations and other organizations are providing their employees and other associates with, and/or otherwise enabling their employees and other associates to use, mobile devices, such as smart phones, tablet computers, and other mobile computing devices. As these devices continue to grow in popularity and provide an increasing number of functions, many organizations may wish to ensure that the software applications that can be downloaded to and/or executed on such devices are safe and secure, both for the protection of the device users and for the protection of the organization itself and its own computer systems and networks.

SUMMARY

Various aspects of the disclosure provide efficient, effective, functional, and convenient ways of ensuring the safety and/or security of software applications that may be downloaded to and/or executed on mobile computing devices.

For example, in one or more embodiments discussed in greater detail below, the integrity of one or more applications that may be submitted to, included in, provided via, and/or otherwise associated with an application store may be evaluated and/or used in a number of different ways to provide one or more of these and/or other advantages. In some instances, the application store may be an enterprise application store that is provided by an organization to enable its employees and other affiliates to access, obtain, download, and/or run applications on their mobile devices, and the application store may be configured to determine an integrity score for each application associated with the application store and subsequently use the integrity score in determining whether each application should be published in the application store.

In particular, in some embodiments, an application store, which may be provided by one or more computing devices, may analyze one or more aspects of an application. Subsequently, the application store may determine, based on the one or more analyzed aspects of the application, an integrity score for the application. Based on the integrity score, the application store may determine whether to publish the application in the application store. In response to determining to publish the application in the application store, the application store then may publish the application in the application store. Alternatively, in response to determining not to publish the application in the application store, the application store may generate a notification indicating that the application has an insufficient integrity score.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to evaluating application integrity. Before discussing these concepts in greater detail, however, several examples of computing architecture and enterprise mobility management architecture that may be used in implementing and/or otherwise providing various aspects of the disclosure will first be discussed with respect to FIGS. 1-6.

Computing Architecture

Figure 1:
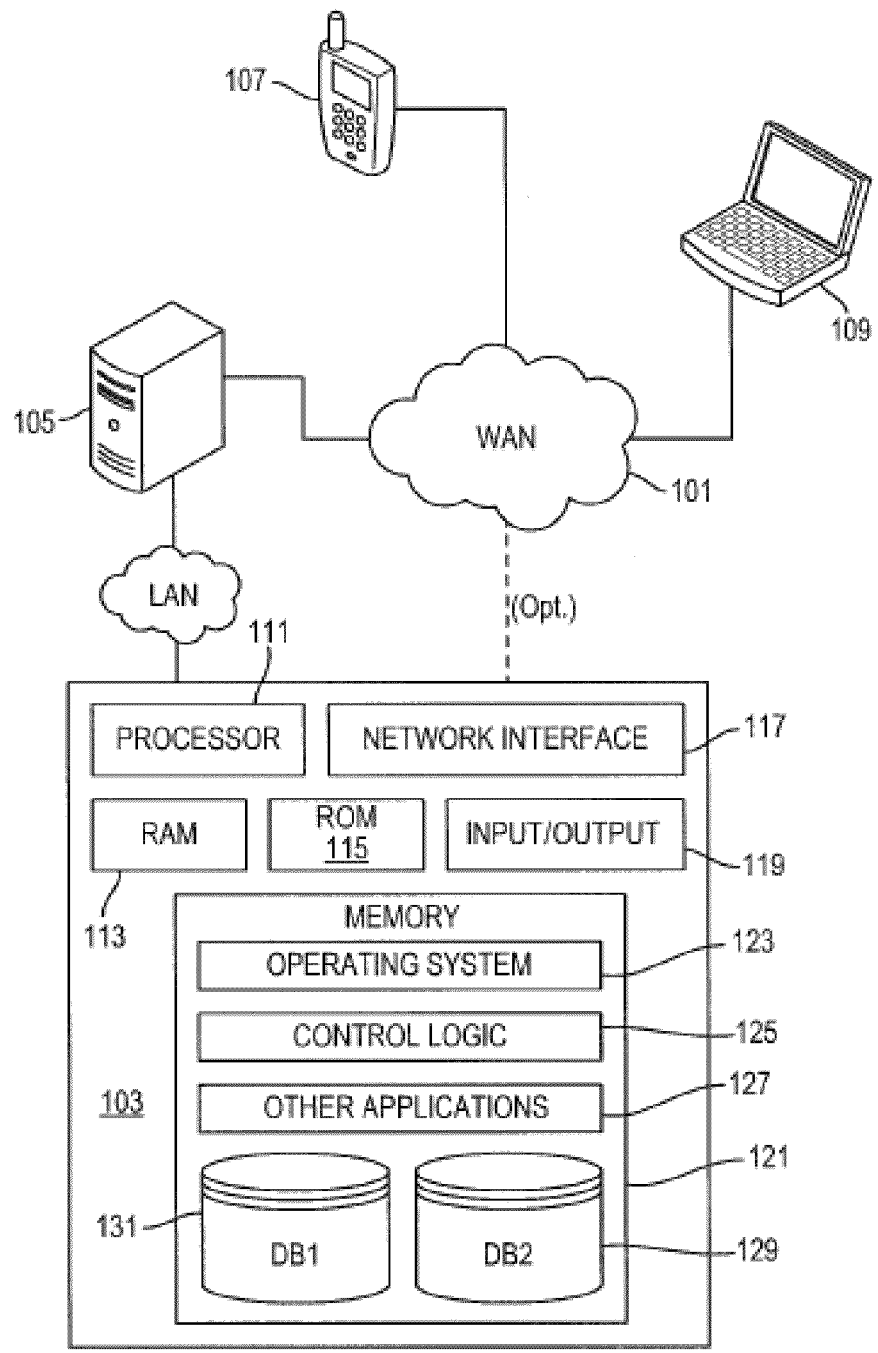
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
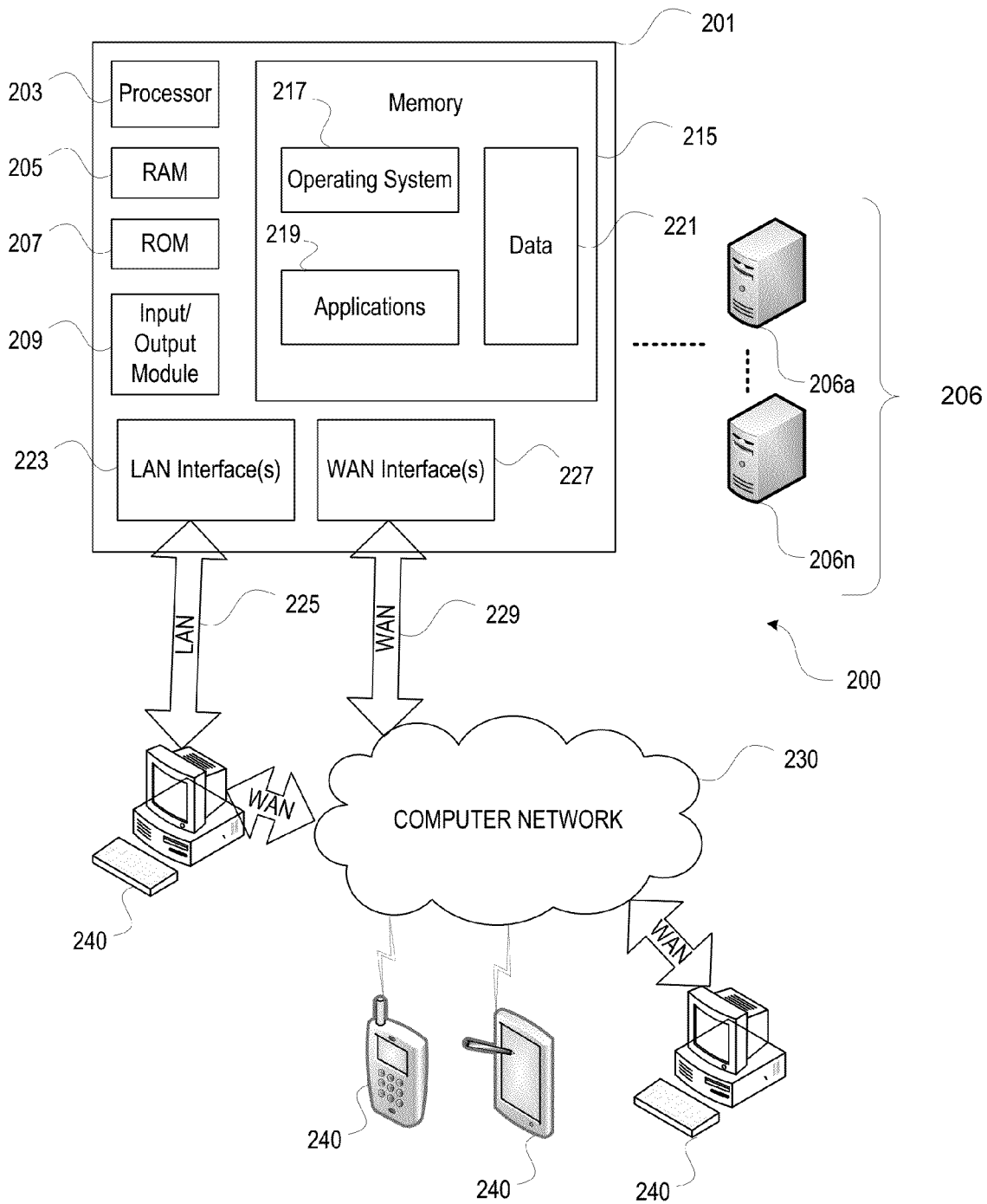
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
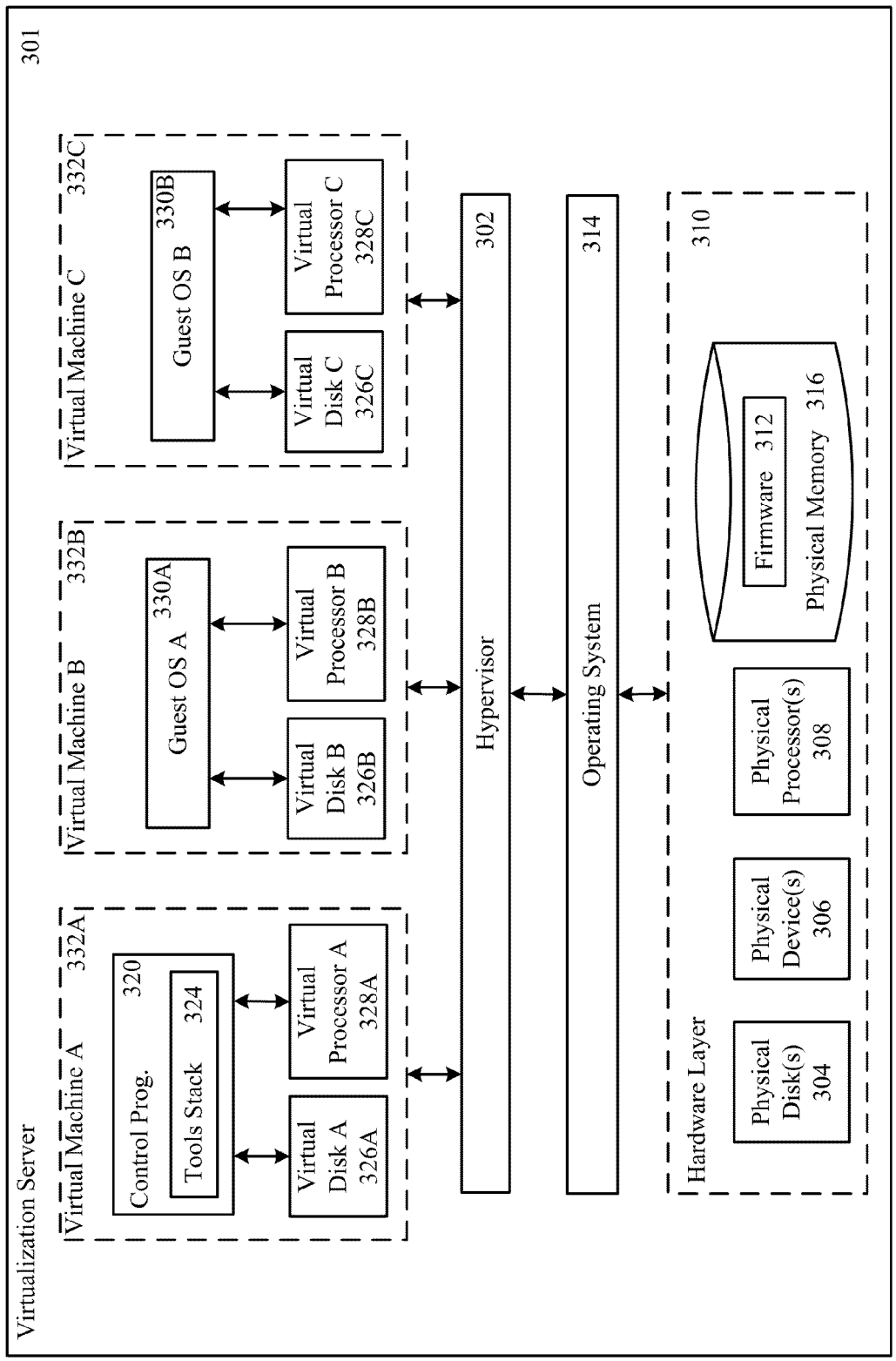
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
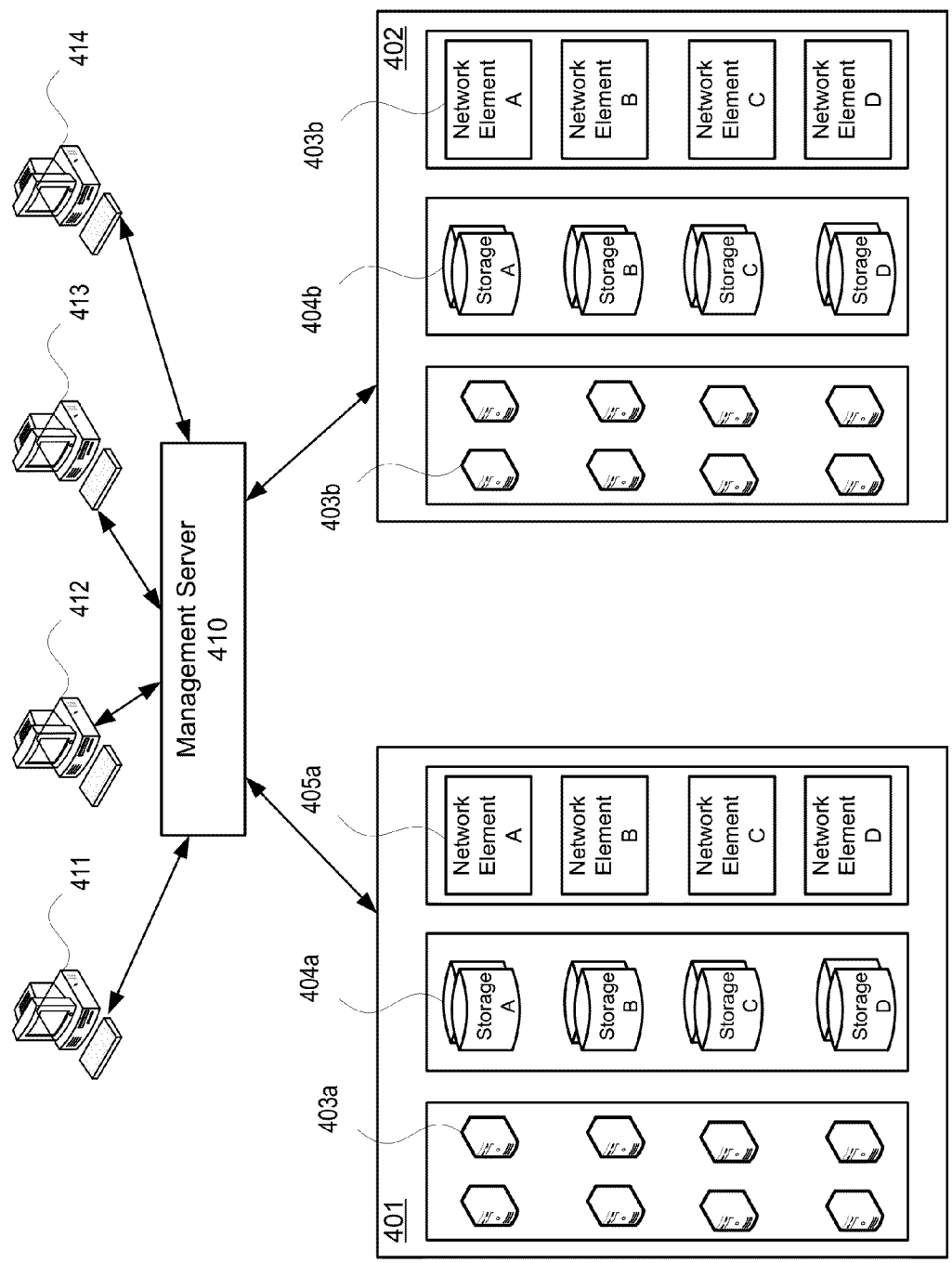
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
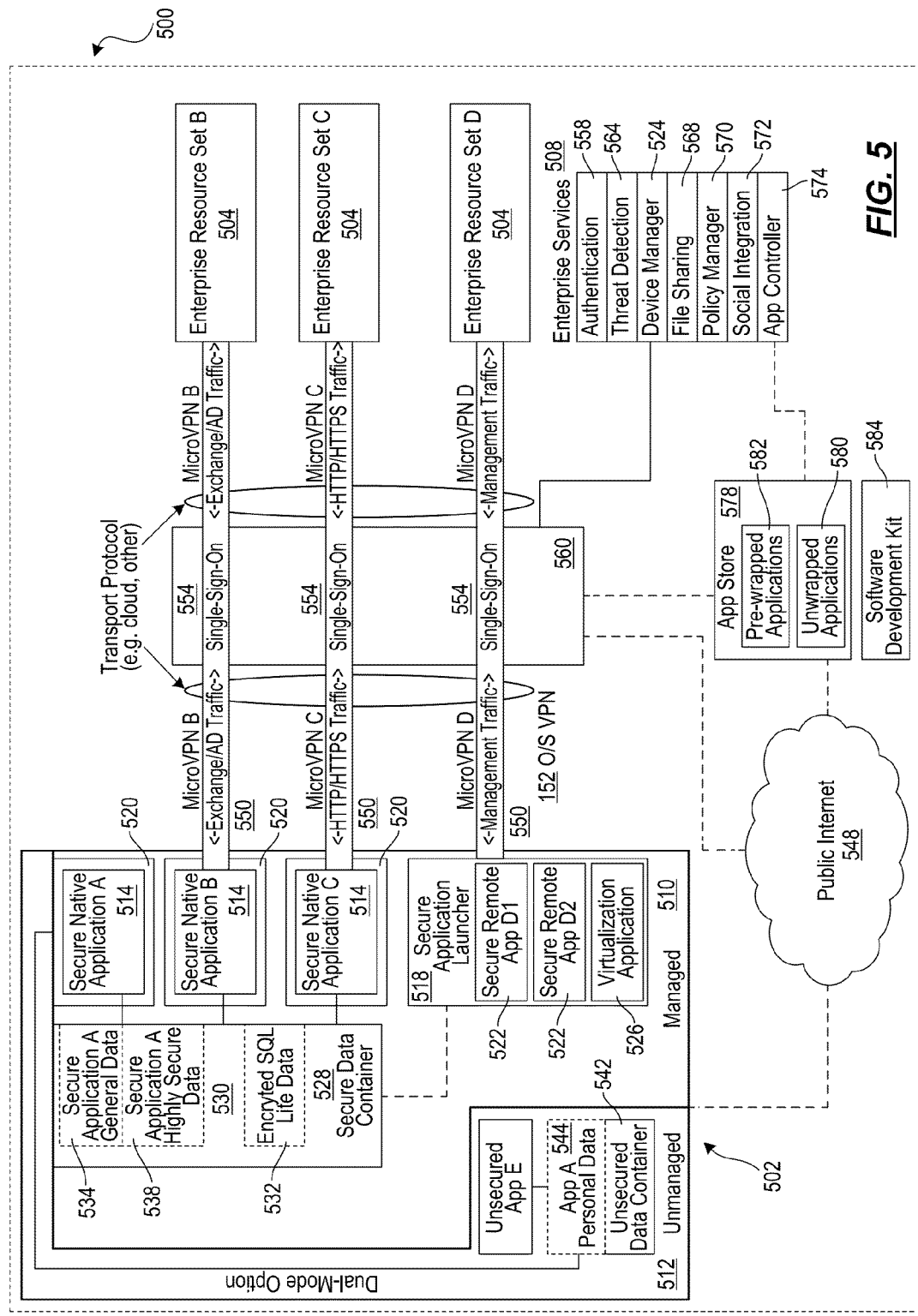
FIG. 5 depicts an illustrative enterprise mobility management system that may be used in accordance with one or more illustrative aspects described herein.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device may run an iOS operating system, Android operating system, and/or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device or a managed device.

In some embodiments, the operating system of the mobile device may be separated into a managed partition 510 and an unmanaged partition 512. The managed partition 510 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections (also referred to at microVPN or application-specific VPN) may be specific to particular applications 550, particular devices, particular secured areas on the mobile device, and the like (e.g., 552). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use user interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
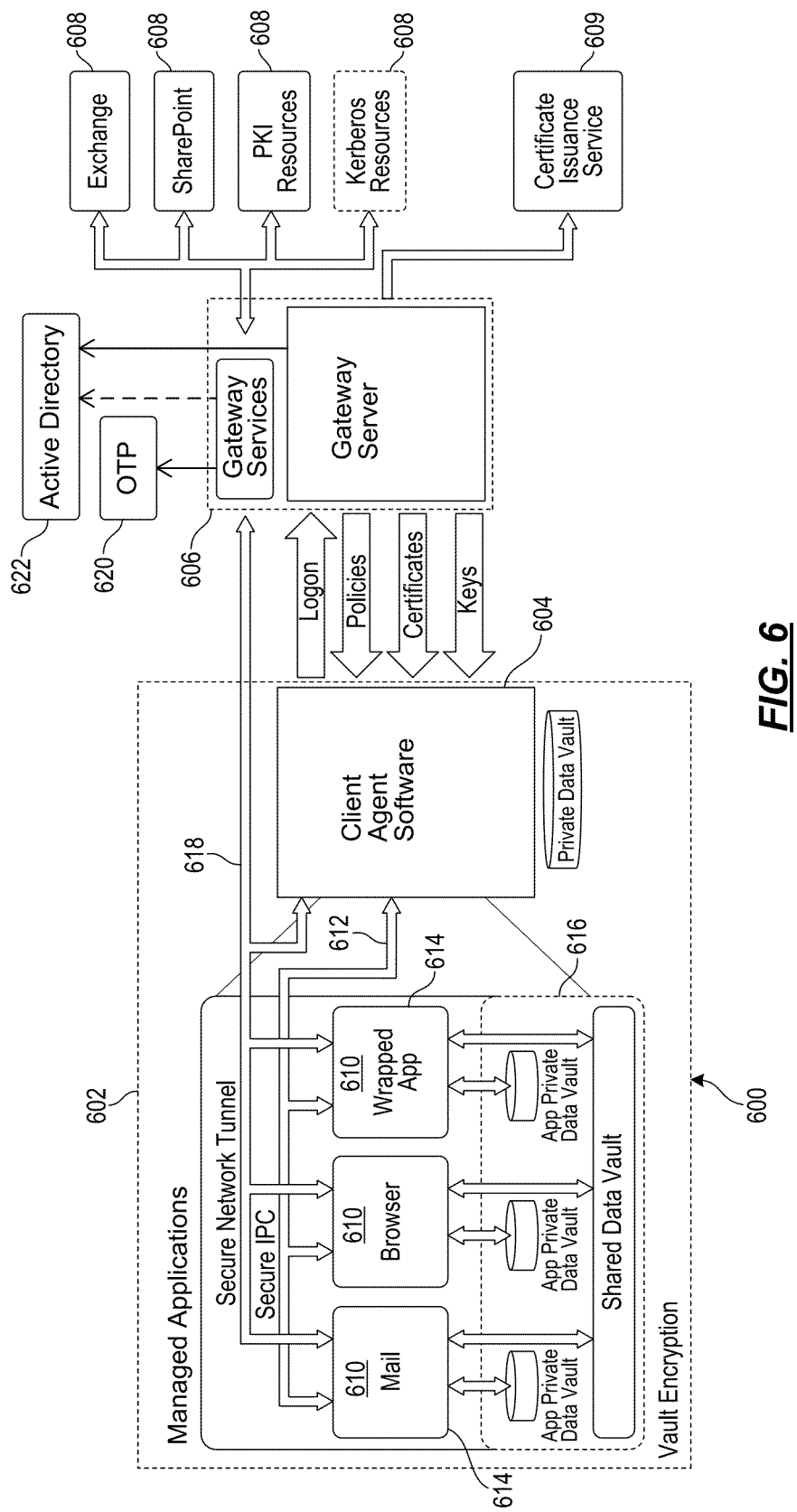
FIG. 6 depicts another illustrative enterprise mobility management system that may be used in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled/managed mobile device 602 with a client agent 604, which interacts with gateway server 606 (which includes access gateway and application controller functionality) to access various enterprise resources 608 and services 609 such as Exchange, Sharepoint, PKI Resources, Kerberos Resources, and Certificate Issuance Service, as shown on the right hand side above. Although not specifically shown, the mobile device 602 may also interact with an application store for the selection and downloading of applications.

The client agent 604 acts as the UI (user interface) intermediary for Windows apps/desktops hosted in an Enterprise data center, which are accessed using a display remoting protocol, such as but not limited to the ICA protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and the application management framework (AMF) of this architecture act to provide policy driven management capabilities and features such as connectivity and SSO (single sign on) to enterprise resources/services 608. The client agent 604 handles primary user authentication to the enterprise, normally to the access gateway (AG) with SSO to other gateway server components. The client agent 604 obtains policies from gateway server 606 to control the behavior of the AMF managed applications 610 on the mobile device 602. In some alternative embodiments, one or more of the native applications (which may, e.g., be included in the managed applications 610) may provide installation and/or management functionalities with receiving commands from and/or otherwise interacting with the client agent 604.

In some embodiments, client agent 604 might function solely as a policy agent on the mobile device, and a separate client agent may provide receiver and/or virtualization functions (e.g., using the display remoting protocol discussed above). In such a split-functionality implementation, the client agent 604 may, for example, support installation and/or management of native applications, but might not provide receiver and/or virtualization functions, which may instead be performed and/or provided by a different client agent running on the mobile device.

The secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606. Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through gateway server 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The mail and browser managed applications 610 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256-bit encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want the enterprise application store to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via a micro VPN feature). For example, an email application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Client certificate support on iOS may rely on importing a PKCS 12 BLOB (Binary Large Object) into the iOS keychain in each managed application for each period of use. Client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP negotiate authentication challenges. The limited support feature relates to constrained delegation in AGEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of the enterprise application store and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Integrity Evaluation Features

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to evaluating application integrity. In the description below, various examples illustrating how application integrity may be evaluated in accordance with one or more embodiments will be discussed.

Figure 7:
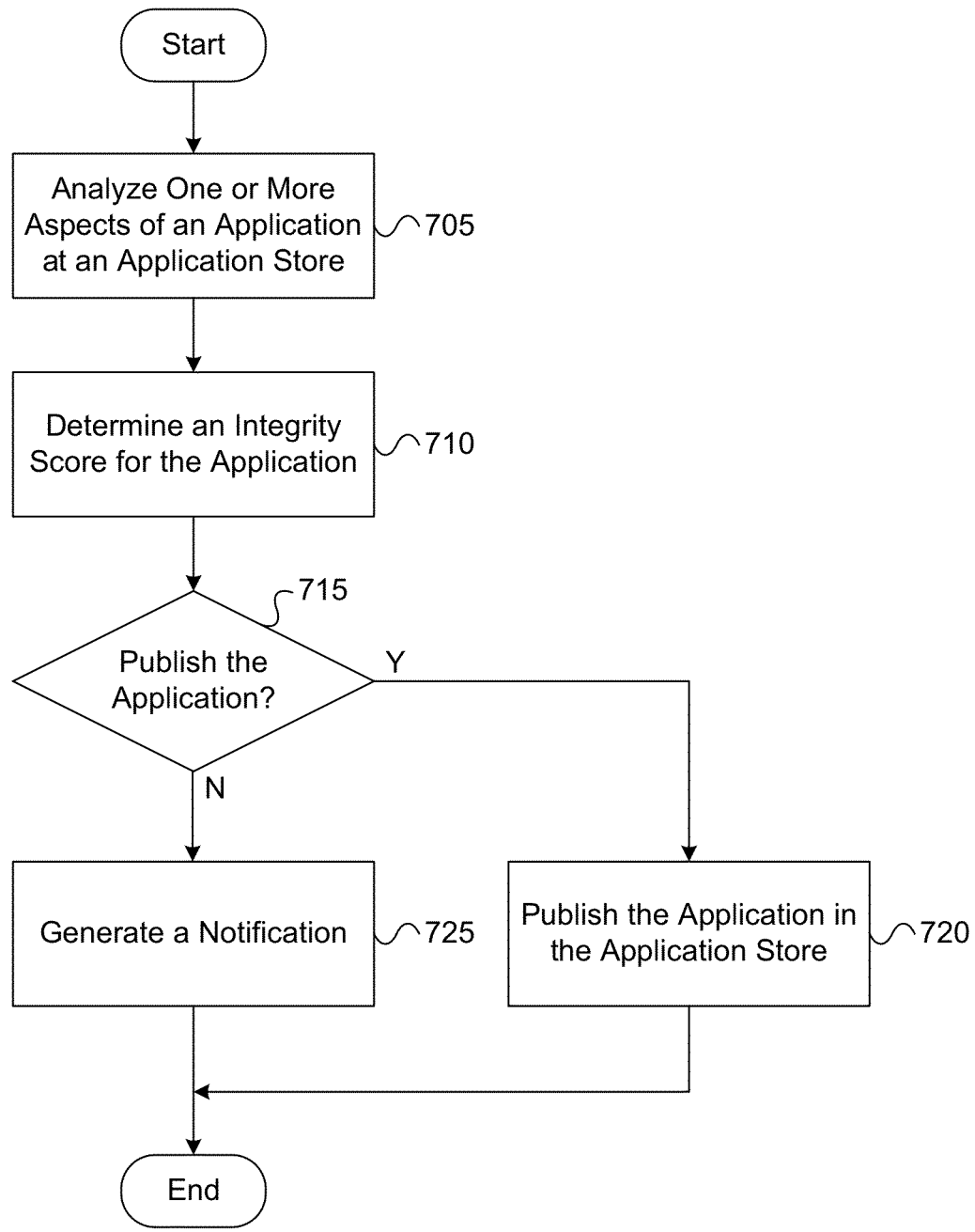
FIG. 7 depicts a flowchart that illustrates a method of evaluating application integrity in accordance with one or more illustrative aspects discussed herein.

FIG. 7 depicts a flowchart that illustrates a method of evaluating application integrity in accordance with one or more illustrative aspects discussed herein. In one or more embodiments, the method illustrated in FIG. 7 and/or one or more steps thereof may be performed by a computing device (e.g., generic computing device 201). In other embodiments, the method illustrated in FIG. 7 and/or one or more steps thereof may be embodied in computer-executable instructions that are stored in a computer-readable medium, such as a non-transitory computer-readable memory.

As seen in FIG. 7, the method may begin in step 705, in which one or more aspects of an application may be analyzed by an application store. For example, in step 705, an application store and/or one or more computing devices that may be executing and/or otherwise providing the application store may analyze various aspects of an application. In one or more arrangements, the application store performing the method illustrated in FIG. 7 and/or the other methods and/or method steps discussed herein may embody and/or implement one or more aspects of application store 578 and/or may be provided by enterprise mobility technical architecture 500, as discussed above with respect to FIG. 5. In at least one arrangement, the application store may, for instance, be a software application that is running on and/or provided by one or more computing devices (which may, e.g., include one or more servers and/or server computing devices). In addition, the application store may, in some instances, be an enterprise application store that is provided by an organization to enable its employees and other affiliates to access, obtain, download, and/or run various applications on their mobile devices and/or other computing devices. Such an application store may, for instance, include one or more cloud-based components (which may, e.g., be provided by and/or executed on one or more server computers) and one or more device-based components (which may, e.g., be provided by and/or executed on one or more end user devices, such as an end user device on which an application may be installed and run by a user of the application store).

Although many of the examples discussed herein involve an application store analyzing various aspects of an application (e.g., in accordance with the method illustrated in FIG. 7), an application store is just one type of computer system that may perform such an analysis. For example, in additional and/or alternative embodiments, the application analysis functionalities discussed herein may be included in and/or otherwise provided by an integrated development environment (IDE) that may, for instance, provide various and/or comprehensive software development functionalities, including source code editing functionalities, build automation tools, debugging functionalities, and/or additional functionalities, thereby allowing a software developer to evaluate the integrity of an application within the IDE and/or before submitting the application to an application store. In addition, in instances in which the integrity of an application is evaluated by such an IDE prior to submission to an application store, the application store may simply accept an integrity score determined by the IDE (e.g., instead of analyzing the application and determining an integrity score to determine whether to publish the application, as discussed below). In other instances, the application store may still analyze the application and determine an integrity score for the application, even though the application may have already been evaluated, and an integrity score determined, by the IDE. In still other embodiments, the application analysis functionalities discussed herein may be performed and/or otherwise provided by an enterprise computer system that is not associated with an application store or a non-enterprise computer system that is not associated with an application store. For example, such a system may simply be configured to rate an application (e.g., by analyzing the application and determining an integrity score for the application, as discussed below) and take one or more other actions, such as submitting the rating application to one or more application stores for approval and/or publication. Such an arrangement may be ideal for ecosystems that include multiple application stores.

Continuing to refer to FIG. 7, the application that may be analyzed by the application store in step 705 may be a new application that has been submitted to the application store for the first time, a new version of a previously-submitted and/or previously-evaluated application, or an existing application that is already available via and/or otherwise included in the application store. The aspects of the application that may be analyzed by the application store in step 705 may include the function calls made by the application; the data, objects, and/or resources that are used by and/or provided as inputs to the application; the data, objects, and/or resources that are used by and/or provided as outputs of the application; and/or other interactions that the application may have with other data, objects, and/or resources (which may, e.g., include both local interactions with data, objects, and/or resources on the same device that may execute the application as well as remote interactions with data, objects, and/or resources on other devices that may different from the device executing the application).

In some instances, the application store may, for example, periodically evaluate any and/or all of the applications that are available via and/or otherwise included in the application store (even if they have been previously evaluated) by performing the method illustrated in FIG. 7. Thus, the application being analyzed by the application store in step 705 may, in some instances, be an existing application that is already available via and/or otherwise included in the application store.

In some embodiments, analyzing the one or more aspects of the application may include performing a static analysis of the application. For example, in analyzing the one or more aspects of the application, the application store and/or one or more computing devices providing the application store may perform a static analysis of the application, as discussed in greater detail below with respect to FIG. 8.

In some embodiments, analyzing the one or more aspects of the application may include performing a dynamic analysis of the application. For example, in analyzing the one or more aspects of the application, the application store and/or one or more computing devices providing the application store may perform a dynamic analysis of the application, as discussed in greater detail below with respect to FIG. 9.

In some embodiments, analyzing the one or more aspects of the application may include performing a combined analysis of the application. For example, in analyzing the one or more aspects of the application, the application store and/or one or more computing devices providing the application store may perform a combined analysis of the application, as discussed in greater detail below with respect to FIG. 10.

Continuing to refer to FIG. 7, in step 710, the application store may determine, based on the one or more analyzed aspects of the application, an integrity score for the application. In some instances, the integrity score determined in step 710 may be a result of the analysis performed in step 705. For example, the static analysis, the dynamic analysis, and/or the combined analysis discussed above may produce and/or return an integrity score for the application, which may be received by the application store and determined to be the integrity score for the application in step 710.

In one or more arrangements, the integrity score may be a numerical value representing the extent to which the application may be considered safe and/or secure. In particular, the numerical value that may be calculated by the application store as being the integrity score for a particular application may represent the degree to which a particular application performs in the way(s) in which it is expected to perform (e.g., based on historical usage and/or testing of the application, based on advertising and/or marketing of the application, based on the terms of use and/or license agreement of the application, etc.). For example, an application with a relatively high integrity score may objectively perform in the way(s) that it is expected to perform (e.g., by making function calls and/or interacting with specific data, objects, and/or resources in an expected manner), while another application with a relatively low integrity score may objectively perform in way(s) that it is not expected to perform (e.g., by making function calls and/or interacting with specific data, objects, and/or resources in an unexpected manner). As illustrated further in the examples discussed below, the integrity score determined in step 710 may be used in making various decisions with respect to the application, including determining whether or not to publish the application to any and/or all users of the application store.

In step 715, the application store may determine, based on the integrity score, whether to publish the application in the application store. For example, in step 715, the application store may evaluate whether the integrity score for the application meets or exceeds one or more predetermined threshold values, and based on this evaluation, may determine whether to publish the application in the application store by making the application available to one or more users of the application store. For instance, if the integrity score determined in step 710 is at or above a predetermined threshold value, the application store may determine, in step 715, to publish the application. Alternatively, if, for instance, the integrity score determined in step 710 is below the predetermined threshold value, the application store may determine, in step 715, not to publish the application.

In one or more arrangements, the threshold values that may be used in determining whether to publish an application in step 715 may vary for different applications and/or types of applications. For example, applications dealing with finance and/or the management of sensitive or confidential information may be subject to more stringent integrity requirements (and accordingly may require higher threshold values for their integrity score for publication in the application store) than entertainment applications, such as video games and media playback applications. In addition, different users and/or groups of users also may be able to access, download, and/or use applications in the application store that have different integrity scores and/or meet different threshold values for integrity scores. For example, information technology personnel within an organization may have greater access to the application store and accordingly may be able to access, download, and/or use an application with an integrity score that meets only a relatively low integrity score threshold (e.g., for testing purposes), while other types of users within an organization (who may, e.g., have different roles within the organization which may be implementing the application store) might not be able access, download, and/or use such an application.

In step 720, in response to determining to publish the application in the application store, the application store may publish the application in the application store. For example, in publishing the application in the application store in step 720, the application store may make the application available for access, download, and/or installation by one or more users via one or more pages of the application store. This may, for instance, include generating a page for the application in the application store, generating one or more banners and/or advertisements for the application, and/or sending one or more notifications to users who may be able to access, download, and/or install the application (e.g., indicating that the application is now available in the application store). In some instances, in publishing the application in the application store, the application store may provide information about the application's integrity score to one or more users of the application store (e.g., by causing such information to be included in one or more pages of the application store). This information may, for instance, include a numerical value (which may, e.g., be the actual numerical value determined in step 710 to be the integrity score for the application), a range indicator (which may, e.g., be a color-coded indicator indicating the range in which the integrity score for the application falls, such as green, yellow, orange, red, etc.), and/or specific information about unexpected functions and/or other unexpected types of actions invoked by and/or otherwise found in the application.

Alternatively, in step 725, in response to determining not to publish the application in the application store, the application store may generate a notification indicating that the application has an insufficient integrity score. For example, such a notification may be generated and/or sent to the one or more users who submitted the application for evaluation and/or to one or more administrative users who may maintain and/or administer the application store (who may, e.g., be information technology personnel within the organization that is implementing the application store). The notification that is generated and/or sent in step 725 may, for example, include information indicating why the integrity score was determined to be insufficient and/or otherwise low. For instance, the notification may include information indicating that the application is making certain function calls that it should not be making; information indicating that the application is accessing and/or modifying data, objects, and/or resources that it should not be accessing and/or modifying; and/or information indicating that the application is having other interactions that it should not be having (e.g., because it is not advertised as having such interactions, because such interactions were not disclosed to the application store when the application was submitted to the application store for evaluation, etc.).

In some embodiments, publishing the application in the application store may include making the application available to a first group of users of the application store based on the integrity score exceeding a first threshold. For example, a threshold (e.g., a predetermined threshold value) may be used by the application store in determining whether to publish the application at all, as illustrated in several of the examples discussed above. If, for instance, the integrity score determined in step 710 is below or equal to the first threshold, then the application store may prevent the application from being accessed, downloaded, installed, and/or used by the first group of users and/or may otherwise make the application unavailable to the first group of users. On the other hand, if, for instance, the integrity score determined in step 710 exceeds the first threshold, then the application store may allow the application to be accessed, downloaded, installed, and/or used by the first group of users and/or may otherwise make the application available to the first group of users. In some instances, the first group of users may encompass all users of the application store, while in other instances, the first group of users might include only a subset of the users of the application store. For instance, the first group of users might only include users who are members of certain departments (e.g., engineering, sales, accounting, legal, etc.) or specific teams within the organization (e.g., an executive team, a risk management team, a recruitment team, etc.).

In some embodiments in which the application may be made available to a first group of users of the application store based on the integrity score exceeding a first threshold, publishing the application in the application store may further include making the application available to a second group of users of the application store based on the integrity score exceeding a second threshold, where the second group of users is different from the first group of users, and the second threshold is greater than the first threshold. For example, if the integrity score for a certain application exceeds the first threshold but not the second threshold, the application store may make the application available only to a first group of users (which may, e.g., include information technology support staff and/or approved beta testers within an organization) without making the application available to the second group of users (which may, e.g., encompass all users of the application store, all employees and/or affiliates of the organization, etc.). Alternatively, if the integrity score for the application exceeds both the first threshold and the higher second threshold, the application store may make the application available to the second group of users (which may, e.g., include authorized and/or intended users of the application within the organization, all users of the application store, all employees and/or affiliates of the organization, etc., and thus may, in some instances, even include the first group of users).

In some embodiments, publishing the application in the application store may include wrapping the application using an application management framework. For example, in publishing the application in the application store in step 720, the application store may wrap the application using an application management framework, such as the application management framework 614 discussed above. In this way, the application store might only wrap a given application after determining an integrity score for the application (e.g., in step 710) and subsequently determining (e.g., in step 715) that the integrity score is sufficient for the application to be wrapped and/or otherwise published. For example, if the integrity score for a particular application falls below a predetermined threshold, the application might not be wrapped or otherwise published by the application store. In addition, by wrapping the application using the application management framework, the application store may apply and/or otherwise subject the application to one or more policies (which may, e.g., control and/or restrict various aspects of the application and/or various aspects of the device on which the application may be installed and/or executed, as discussed above).

Figure 8:
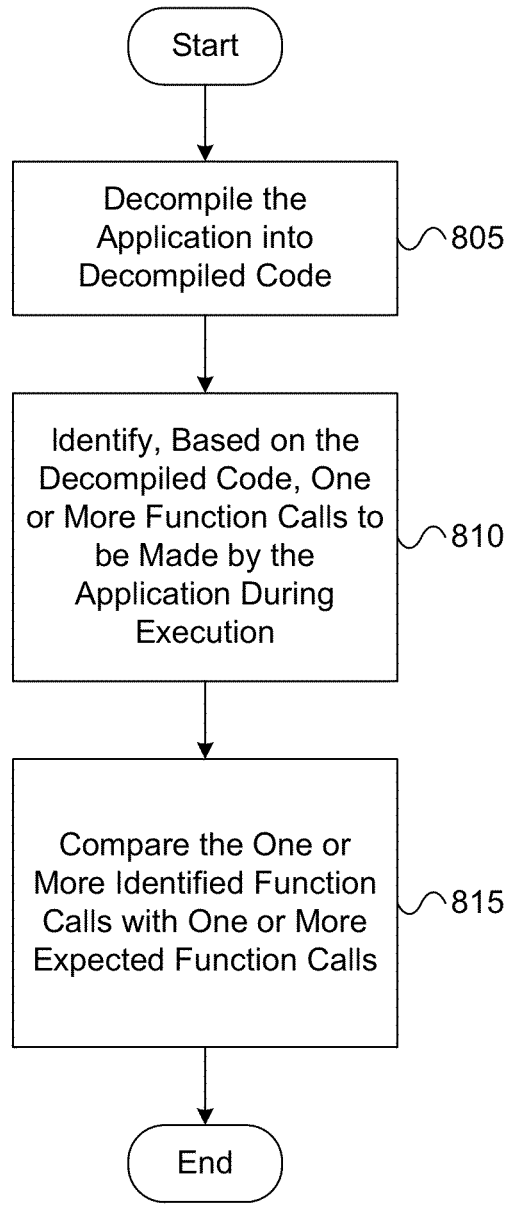
FIG. 8 depicts a flowchart that illustrates a method of performing a static analysis of an application in accordance with one or more illustrative aspects discussed herein.

FIG. 8 depicts a flowchart that illustrates a method of performing a static analysis of an application in accordance with one or more illustrative aspects discussed herein. As indicated above, the example method illustrated in FIG. 8 may be performed by an application store in analyzing one or more aspects of an application. For instance, the example method illustrated in FIG. 8 may be performed by one or more computing devices (which may, e.g., implement one or more aspects of generic computing device 201) that may provide such an application store and/or that may be executing the other methods and/or method steps discussed herein. Additionally or alternatively, the example method illustrated in FIG. 8 and/or one or more steps thereof may be embodied in computer-executable instructions that are stored in a computer-readable medium, such as a non-transitory computer-readable memory.

As seen in FIG. 8, the method may begin in step 805, in which the application may be decompiled into decompiled code. For example, in step 805, the application store may decompile the application to be analyzed into decompiled code. In some instances, to decompile the application, the application store may utilize and/or invoke one or more functions that may be provided via an application management framework and/or via one or more application programming interfaces (APIs) to decompile an application. Additionally or alternatively, the application store software may include a decompiler (and/or may access an external decompiler) that may be used in step 805 in translating program code associated with the application into the decompiled code (which may, e.g., include human-readable source code or substantially human-readable source code). In one or more arrangements, in decompiling the application, the application store may generate source code for the application that may be expressed in one or more programming languages that the application store is able to parse (e.g., Java, C++, etc.).

In step 810, one or more function calls to be made by the application during execution may be identified based on the decompiled code. For example, in step 810, the application store may identify, based on the decompiled code, one or more function calls to be made by the application during execution. In particular, the decompiled code may reveal, indicate, and/or otherwise include one or more function calls, and in identifying the function calls to be made by the application during execution, the application store may parse the decompiled code to classify and/or recognize the function calls. In parsing the decompiled code to classify and/or recognize the function calls, the application store may, for example, determine the type(s) of function calls to be made by the application during execution and/or the name(s) of and/or other specific attributes of the function calls to be made during execution. For instance, in determining the type(s) of function calls to be made by the application during execution, the application store may classify each function call based on whether the particular function call involves reading, writing, and/or otherwise modifying local data; whether the particular function call involves reading, writing, and/or otherwise modifying remote data; whether the particular function call involves determining and/or using current device location; whether the particular function call involves accessing input received via one or more hardware components, such as a GPS receiver, compass, microphone, camera, etc.; whether the particular function call involves providing output via one or more hardware components, such as a speaker, a display, etc.; and/or other factors.

In step 815, the one or more identified function calls may be compared with one or more expected function calls. For example, in step 815, the application store may compare the one or more identified function calls with one or more expected function calls. In one or more arrangements, expected function calls for various applications may be stored in a database that can be accessed by the application store. The expected function calls for each application may, for instance, be previously determined and/or defined by an administrative user of the application store. Additionally or alternatively, the expected function calls for each application may be determined and/or predicted during a combined analysis, as discussed below, and/or during another automated analysis process. In some instances, the expected function calls included in the database may be defined for specific applications, while in other instances, the expected function calls included in the database may be defined for specific types of applications (which may, e.g., enable the application store to evaluate new, previously-unexamined applications simply based on their type). For instance, expected function calls may be defined for word processing applications, communications applications, entertainment applications, and/or other types of applications.

In some embodiments, one or more of the expected function calls (which may, e.g., be used in the comparing discussed above with respect to step 815 and/or in other instances discussed herein) may be identified by the developer of the application and/or otherwise submitted to the application store by the developer. For example, the developer of an application may provide information to the application store indicating that the application uses location services, camera functionalities, remote access functionalities, and/or the like, and this information may be used by the application store as the basis for the expected function calls. Subsequently, the application store may use the identified function calls and/or other information provided by the application developer in evaluating the function calls made by the application.

In comparing the one or more identified function calls with one or more expected function calls for the application, the application store may determine an integrity score for the application by calculating a value that reflects the extent to which the identified function calls match up with and/or otherwise correspond to the expected function calls. For example, the value calculated by the application store (which may, e.g., be determined to be the integrity score for the application and/or may be subsequently used as the integrity score for the application) may be a percentage that reflects the percent of the identified function calls that are included in the expected function calls. For instance, the expected function calls for a note-taking application may include function calls for loading, saving, and/or modifying locally stored data and/or interacting with remote network resources, but might not include determining current device location or accessing audio input received via a device microphone. If these location-determining or microphone-accessing function calls are included in the identified function calls for a note-taking application, their presence may reduce the integrity score for the application, which accordingly may bring the application's integrity score below a predetermined threshold and thus prevent the application from being published in the application store, as illustrated in the examples discussed above.

Figure 9:
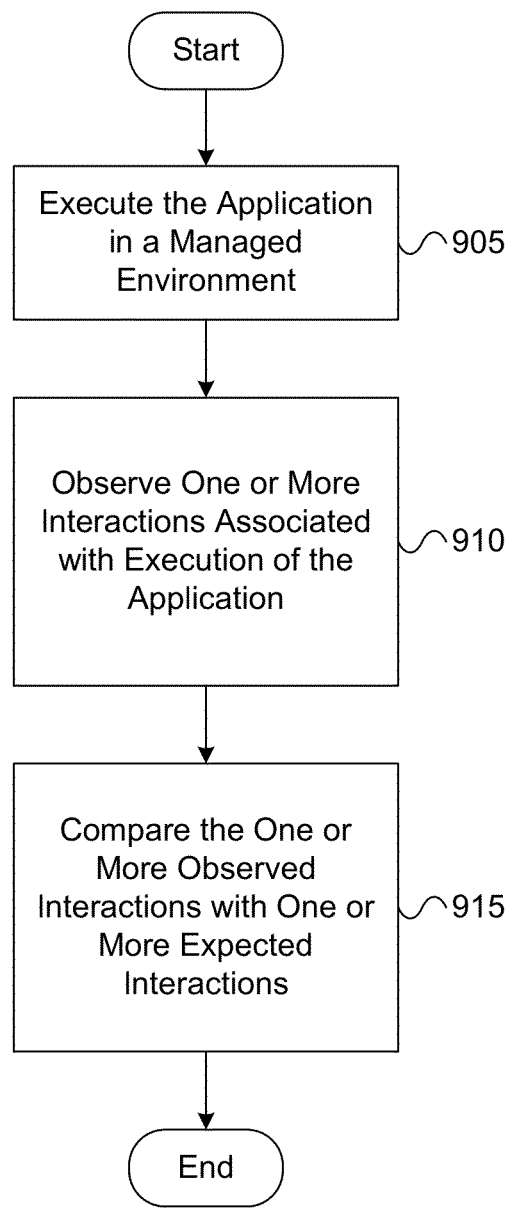
FIG. 9 depicts a flowchart that illustrates a method of performing a dynamic analysis of an application in accordance with one or more illustrative aspects discussed herein.

FIG. 9 depicts a flowchart that illustrates a method of performing a dynamic analysis of an application in accordance with one or more illustrative aspects discussed herein. As indicated above, the example method illustrated in FIG. 9 may be performed by an application store in analyzing one or more aspects of an application. For instance, the example method illustrated in FIG. 9 may be performed by one or more computing devices (which may, e.g., implement one or more aspects of generic computing device 201) that may provide such an application store and/or that may be executing the other methods and/or method steps discussed herein. Additionally or alternatively, the example method illustrated in FIG. 9 and/or one or more steps thereof may be embodied in computer-executable instructions that are stored in a computer-readable medium, such as a non-transitory computer-readable memory.

As seen in FIG. 9, the method may begin in step 905, in which the application may be executed in a managed environment. For example, in step 905, the application store may execute the application to be analyzed in a managed environment. The managed environment may, for instance, be part of the application store and/or may be provided by one or more of the computing devices that are also executing and/or otherwise providing the application store. In addition, the managed environment may, for instance, provide one or more functions and/or other tools for recording and/or simulating user input and/or other events for applying stimuli to the application. Additionally or alternatively, the managed environment may provide one or more functions and/or other tools for observing interactions between the application and other data, objects, and/or resources.

In some embodiments, executing the application in the managed environment may include recording one or more manually-applied application stimuli during a training mode in which the application is executed for a first time, and may further include automatically applying the one or more recorded application stimuli during an automated testing mode in which the application is executed at least one additional time. For example, in executing the application in the managed environment, the application store may record one or more manually-applied application stimuli during a training mode in which the application is executed for a first time. Subsequently, during an automated testing mode in which the application is executed at least one additional time, the application store may automatically apply the one or more recorded application stimuli to the application to observe and/or evaluate how the application responds and/or otherwise interacts with other data, objects, and/or resources. In observing and/or evaluating how the application responds during the automated testing mode, the application store may, for instance, compare the interactions that occur during the training mode with the interactions that occur during the automated testing mode to determine if any differences exist between these interactions. If, for instance, differences do exist between these interactions, then the application store may determine that the application behaves differently during different instances of execution, and such a determination may negatively affect the integrity score for the application (e.g., by a predetermined amount, by a scaled amount, etc.).

In step 910, one or more interactions associated with execution of the application may be observed based on the executing. For example, in step 910, the application store may observe, based on the executing of the application in the managed environment (e.g., performed in step 905), one or more interactions associated with execution of the application. The interactions observed by the application store may, for instance, include function calls made by the application during execution in the managed environment, results and/or other data received by the application from other resources during execution, changes and/or other modifications made by the application to other local resources and/or data during execution, changes and/or other modifications made by the application to remote resources and/or data during execution, and/or other actions performed by, on, and/or because of the application during execution.

In step 915, the one or more observed interactions may be compared with one or more expected interactions. For example, in step 915, the application store may compare the one or more observed interactions with one or more expected interactions. In one or more arrangements, expected interactions for various applications may be stored in a database that can be accessed by the application store. The expected interactions for each application may, for instance, be previously determined and/or defined by an administrative user of the application store. Additionally or alternatively, the expected interactions for each application may be determined and/or predicted during a combined analysis, as discussed below, and/or during another automated analysis process. In some instances, the expected interactions included in the database may be defined for specific applications, while in other instances, the expected interactions included in the database may be defined for specific types of applications (which may, e.g., enable the application store to evaluate new, previously-unexamined applications simply based on their type). For instance, expected interactions may be defined for word processing applications, communications applications, entertainment applications, and/or other types of applications.

In comparing the one or more observed interactions with one or more expected interactions for the application, the application store may determine an integrity score for the application by calculating a value that reflects the extent to which the observed interactions match up with and/or otherwise correspond to the expected interactions. For example, the value calculated by the application store (which may, e.g., be determined to be the integrity score for the application and/or may be subsequently used as the integrity score for the application) may be a percentage that reflects the percent of the observed interactions that are included in the expected interactions. For instance, the expected interactions for a note-taking application may include function calls for and/or other operations involved in loading, saving, and/or modifying locally stored data and/or interacting with remote network resources, but might not include determining current device location or accessing audio input received via a device microphone. If these location-determining or microphone-accessing interactions are included in the observed interactions for a note-taking application, their presence may reduce the integrity score for the application, which accordingly may bring the application's integrity score below a predetermined threshold and thus prevent the application from being published in the application store, as illustrated in the examples discussed above.

Figure 10:
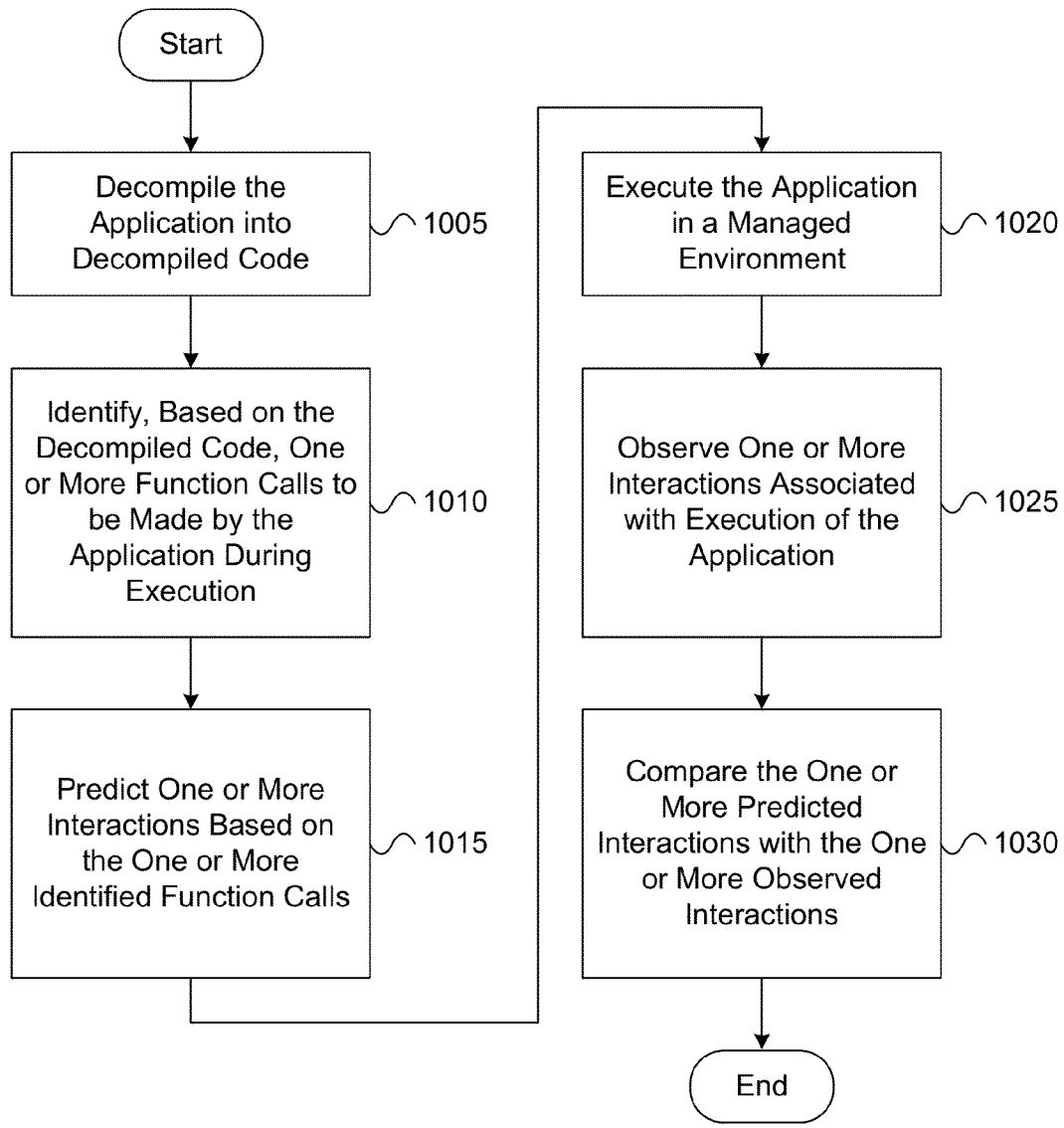
FIG. 10 depicts a flowchart that illustrates a method of performing a combined analysis of an application in accordance with one or more illustrative aspects discussed herein.

FIG. 10 depicts a flowchart that illustrates a method of performing a combined analysis of an application in accordance with one or more illustrative aspects discussed herein. As indicated above, the example method illustrated in FIG. 10 may be performed by an application store in analyzing one or more aspects of an application. For instance, the example method illustrated in FIG. 10 may be performed by one or more computing devices (which may, e.g., implement one or more aspects of generic computing device 201) that may provide such an application store and/or that may be executing the other methods and/or method steps discussed herein. Additionally or alternatively, the example method illustrated in FIG. 10 and/or one or more steps thereof may be embodied in computer-executable instructions that are stored in a computer-readable medium, such as a non-transitory computer-readable memory.

As seen in FIG. 10, the method may begin in step 1005, in which the application may be decompiled into decompiled code. For example, in step 1005, the application store may decompile the application to be analyzed into decompiled code, as in step 805 discussed above.

In step 1010, one or more function calls to be made by the application during execution may be identified based on the decompiled code. For example, in step 1010, the application store may identify, based on the decompiled code, one or more function calls to be made by the application during execution, as in step 810 discussed above.

In step 1015, one or more interactions may be predicted based on the one or more identified function calls. For example, in step 1015, the application store may predict, based on the one or more identified function calls, one or more interactions for the application. The interactions may, for instance, be predicted based on the function calls to be made by the application during execution, including the type(s) of function calls being made, the input parameters of the function calls, the output type(s) of the function calls, expected output value(s) of the function calls, and/or potential and/or expected effects of the application and/or its function calls on other data, objects, and/or resources. For example, in predicting one or more interactions for the application, the application store may access resources and/or other information indicating the expected results and/or interactions associated with various function calls to determine the potential results and/or expected interactions of the identified function calls. Additionally or alternatively, in predicting one or more interactions for the application, the application store may simulate specific function calls to determine the expected results and/or expected interactions of specific function calls. Additionally or alternatively, in predicting one or more interactions for the application store, the application store may access information about other applications that include similar function calls to determine the expected results and/or expected interactions for the application being analyzed. In particular, the application store may, for example, predict that the function calls in the application being analyzed may produce the same results and/or interactions as the function calls produce in the other applications, as may be indicated in the information about the other applications.

In step 1020, the application may be executed in a managed environment. For example, in step 1020, the application store may execute the application being analyzed in a managed environment, as in step 905 discussed above.

In step 1025, one or more interactions associated with execution of the application may be observed based on the executing. For example, in step 1025, the application store may observe, based on the executing of the application in the managed environment (e.g., performed in step 1020), one or more interactions associated with execution of the application, as in step 910 discussed above.

In step 1030, the one or more predicted interactions may be compared with the one or more observed interactions. For example, in step 1030, the application store may compare the predicted interactions (which may, e.g., be determined in step 1015) with the observed interactions (which may, e.g., be determined in step 1025) to calculate an integrity score for the application. In particular, in step 1030, the predicted interactions and the observed interactions may be compared to calculate an integrity score, similar to how observed interactions and expected interactions may be compared in step 915 to determine an integrity score.

For example, in comparing the one or more predicted interactions with the one or more observed interactions, the application store may determine an integrity score for the application by calculating a value that reflects the extent to which the observed interactions match up with and/or otherwise correspond to the predicted interactions. For example, the value calculated by the application store (which may, e.g., be determined to be the integrity score for the application and/or may be subsequently used as the integrity score for the application) may be a percentage that reflects the percent of the observed interactions that are included in the predicted interactions. For instance, the predicted interactions for a note-taking application may include function calls for and/or other operations involved in loading, saving, and/or modifying locally stored data and/or interacting with remote network resources, but might not include determining current device location or accessing audio input received via a device microphone. If these location-determining or microphone-accessing interactions are included in the observed interactions for a note-taking application, their presence may reduce the integrity score for the application, which accordingly may bring the application's integrity score below a predetermined threshold and thus prevent the application from being published in the application store, as illustrated in the examples discussed above.

In some instances, in comparing function calls and/or interactions to calculate an integrity score, additional and/or alternative values and/or calculations may be similarly taken into account (e.g., in addition to and/or instead of calculating a percentage, as in several of the examples discussed above). For example, when comparing function calls and/or interactions to calculate and/or otherwise determine an integrity score for an application, the number of expected or predicted function calls and/or interactions may be compared with the number of identified or observed function calls and/or interactions. As another example, when comparing function calls and/or interactions to calculate and/or otherwise determine an integrity score for an application, the order of expected or predicted function calls and/or interactions may be compared with the order of identified or observed function calls and/or interactions. As another example, when comparing function calls and/or interactions to calculate and/or otherwise determine an integrity score for an application, an expected or predicted amount of memory usage, processor usage, and/or network bandwidth usage may be compared with an identified or observed amount of memory usage, processor usage, and/or network bandwidth usage. While these factors are listed here as examples of the types of factors that may be taken into account when calculating an integrity score in some instances, additional and/or alternative factors may be similarly taken into account when calculating an integrity score in other instances.

As illustrated above, various aspects of the disclosure relate to evaluating application integrity, particularly for software applications that may be downloaded to, installed on, and/or executed by mobile devices, such as smart phones, tablet computers, laptop computers, and/or other types of mobile computing devices. In other embodiments, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method, comprising:
  analyzing, by an application store provided by at least one computing device, one or more aspects of an application;
  determining, by the application store provided by the at least one computing device, based on the one or more analyzed aspects of the application, an integrity score for the application;
  determining, by the application store provided by the at least one computing device, based on the integrity score, whether to publish the application in the application store; and
  in response to determining to publish the application in the application store, publishing, by the application store provided by the at least one computing device, the application in the application store,
  wherein analyzing the one or more aspects of the application comprises:
    executing the application in a managed environment;
    observing, based on the executing, one or more interactions associated with execution of the application; and
    comparing the one or more observed interactions with one or more expected interactions, and
  wherein executing the application in the managed environment comprises:
    recording one or more manually-applied application stimuli during a training mode in which the application is executed for a first time; and
    automatically applying the one or more recorded application stimuli during an automated testing mode in which the application is executed at least one additional time.

2. The method of claim 1, wherein analyzing the one or more aspects of the application includes performing a static analysis of the application, wherein performing the static analysis of the application includes:
  decompiling the application into decompiled code;
  identifying, based on the decompiled code, one or more functions calls to be made by the application during execution; and
  comparing the one or more identified function calls with one or more expected function calls.

3. The method of claim 1, wherein analyzing the one or more aspects of the application includes performing a combined analysis of the application, wherein performing the combined analysis of the application includes:
  decompiling the application into decompiled code;
  identifying, based on the decompiled code, one or more function calls to be made by the application during execution;
  predicting one or more interactions based on the one or more identified function calls;
  executing the application in the managed environment;
  observing, based on the executing, one or more interactions associated with execution of the application; and
  comparing the one or more predicted interactions with the one or more observed interactions.

4. The method of claim 1, wherein publishing the application in the application store includes making the application available to a first group of users of the application store based on the integrity score exceeding a first threshold.

5. The method of claim 4, wherein publishing the application in the application store includes making the application available to a second group of users of the application store based on the integrity score exceeding a second threshold, the second group of users being different from the first group of users, and the second threshold being greater than the first threshold.

6. The method of claim 1, wherein publishing the application in the application store includes wrapping the application using an application management framework.

7. The method of claim 1, further comprising:
in response to determining not to publish the application in the application store, generating, by the application store provided by the at least one computing device, a notification indicating that the application has an insufficient integrity score.

8. A computing device, comprising:
at least one processor; and
memory storing computer-readable instructions that, when executed by the at least one processor, cause the computing device to:
analyze, by an application store provided by the computing device, one or more aspects of an application;
determine, by the application store provided by the computing device, based on the one or more analyzed aspects of the application, an integrity score for the application;
determine, by the application store provided by the computing device, based on the integrity score, whether to publish the application in the application store; and
in response to determining to publish the application in the application store, publish, by the application store provided by the computing device, the application in the application store,
wherein analyzing the one or more aspects of the application comprises:
executing the application in a managed environment;
observing, based on the executing, one or more interactions associated with execution of the application; and
comparing the one or more observed interactions with one or more expected interactions, and
wherein executing the application in the managed environment comprises:
recording one or more manually-applied application stimuli during a training mode in which the application is executed for a first time; and
automatically applying the one or more recorded application stimuli during an automated testing mode in which the application is executed at least one additional time.

9. The computing device of claim 8, wherein analyzing the one or more aspects of the application includes performing a static analysis of the application, wherein performing the static analysis of the application includes:
decompiling the application into decompiled code;
identifying, based on the decompiled code, one or more functions calls to be made by the application during execution; and
comparing the one or more identified function calls with one or more expected function calls.

10. The computing device of claim 8, wherein analyzing the one or more aspects of the application includes performing a combined analysis of the application, wherein performing the combined analysis of the application includes:
decompiling the application into decompiled code;
identifying, based on the decompiled code, one or more function calls to be made by the application during execution;
predicting one or more interactions based on the one or more identified function calls;
executing the application in the managed environment;
observing, based on the executing, one or more interactions associated with execution of the application; and
comparing the one or more predicted interactions with the one or more observed interactions.

11. The computing device of claim 8, wherein publishing the application in the application store includes making the application available to a first group of users of the application store based on the integrity score exceeding a first threshold.

12. The computing device of claim 11, wherein publishing the application in the application store includes making the application available to a second group of users of the application store based on the integrity score exceeding a second threshold, the second group of users being different from the first group of users, and the second threshold being greater than the first threshold.

13. The computing device of claim 8, wherein publishing the application in the application store includes wrapping the application using an application management framework.

14. The computing device of claim 8, wherein the memory stores additional computer-readable instructions that, when executed by the at least one processor, further cause the computing device to:
in response to determining not to publish the application in the application store, generate, by the application store provided by the computing device, a notification indicating that the application has an insufficient integrity score.

15. One or more non-transitory computer-readable media having instructions stored thereon that, when executed, cause at least one computing device to:
analyze, by an application store provided by the at least one computing device, one or more aspects of an application;
determine, by the application store provided by the at least one computing device, based on the one or more analyzed aspects of the application, an integrity score for the application;
determine, by the application store provided by the at least one computing device, based on the integrity score, whether to publish the application in the application store; and
in response to determining to publish the application in the application store, publish, by the application store provided by the at least one computing device, the application in the application store,
wherein analyzing the one or more aspects of the application comprises:
executing the application in a managed environment;
observing, based on the executing, one or more interactions associated with execution of the application; and
comparing the one or more observed interactions with one or more expected interactions, and
wherein executing the application in the managed environment comprises:
recording one or more manually-applied application stimuli during a training mode in which the application is executed for a first time; and
automatically applying the one or more recorded application stimuli during an automated testing mode in which the application is executed at least one additional time.

16. The one or more non-transitory computer-readable media of claim 15, wherein analyzing the one or more aspects of the application includes performing a static analysis of the application, wherein performing the static analysis of the application includes:
    decompiling the application into decompiled code;
    identifying, based on the decompiled code, one or more functions calls to be made by the application during execution; and
    comparing the one or more identified function calls with one or more expected function calls.

17. The method of claim 1, wherein analyzing the one or more aspects of the application comprises analyzing at least one function call made by the application, at least one input provided to the application, and at least one output provided by the application.

18. The method of claim 1, wherein analyzing the one or more aspects of the application comprises:
    analyzing at least one local interaction that the application has with at least one local resource on a computing device executing the application; and
    analyzing at least one remote interaction that the application has with at least one remote resource on a remote computing device different from the computing device executing the application.

19. The method of claim 1, wherein determining the integrity score for the application comprises calculating a value that reflects an extent to which the one or more observed interactions associated with the execution of the application correspond to the one or more expected interactions.

20. The method of claim 1, wherein comparing the one or more observed interactions with one or more expected interactions comprises comparing an observed amount of memory usage, an observed amount of processor usage, and an observed amount of network bandwidth usage with an expected amount of memory usage, an expected amount of processor usage, and an expected amount of network bandwidth usage.

\* \* \* \* \*